G. FROHMANN.
BUTCHER'S IMPLEMENT.
APPLICATION FILED NOV. 10, 1916.

1,220,970.

Patented Mar. 27, 1917.

Inventor
Gabriel Frohmann
By Victor J. Evans
Attorney

Witness
H. S. McDowell

UNITED STATES PATENT OFFICE.

GABRIEL FROHMANN, OF PHILADELPHIA, PENNSYLVANIA.

BUTCHER'S IMPLEMENT.

1,220,970.  Specification of Letters Patent.  Patented Mar. 27, 1917.

Application filed November 10, 1916. Serial No. 130,668.

*To all whom it may concern:*

Be it known that I, GABRIEL FROHMANN, a citizen of the United States of America, residing at 1720 North Warnock street, Philadelphia, in the county of Philadelphia and State of Pennsylvania, have invented new and useful Improvements in Butchers' Implements, of which the following is a specification.

The invention relates to butchering and has for an object to provide an implement for piercing meat.

The invention is particularly adapted for piercing sausages in the making thereof, and to this end is designed and constructed to provide a simple device which when sausage meat is forced into the bladder, forming the container of the former, will pierce the bladder to permit of the escape of a certain amount of air which compresses in the closed end of the bladder, as the sausage meat is forced into the open end thereof under pressure from the usual sausage filling machines, and other implements adapted to a like object.

The invention particularly consists in the movable mounting of the needles so that, whether used as above suggested or not, any needle or needles which may strike upon a hard substance either in use or in case it be dropped, will yield slightly or push upward through the needle plate in a manner more fully described below.

In the further disclosure of the invention reference is to be had to the accompanying drawings constituting a part of this specification, in which similar characters of reference denote corresponding parts in all the views, and in which—

Figure 1:
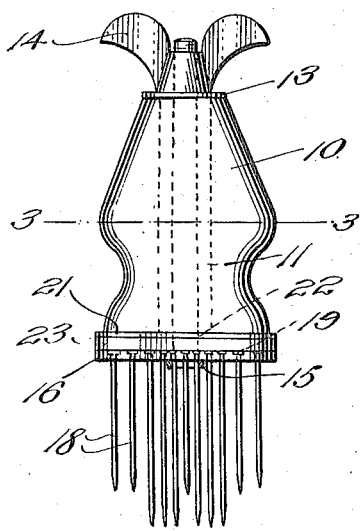
Figure 1 is an elevation of the implement.

Referring more particularly to the views, there is provided a stock or handle 10, preferably made of wood or some other hard material, and shaped to conform to the grip of the hand the handle being tubular for the reception of a sleeve 11, with a bolt 12 passing through the latter and projecting beyond the upper end of the handle, upon which is disposed a washer 13, with a thumb nut 14 threaded on the free projecting end of the bolt, the said bolt having its inner end formed with a suitable head 15 beyond the lower end of the handle.

Figure 2:
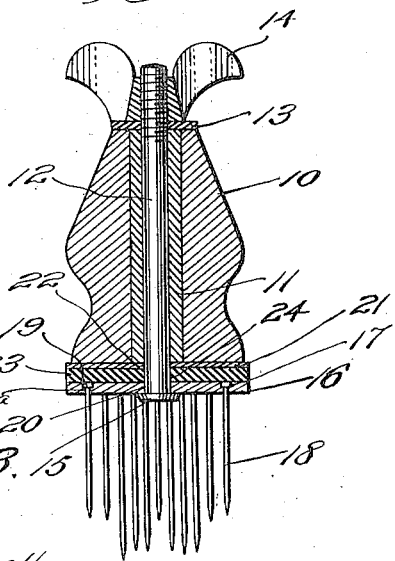
Fig. 2 is a longitudinal sectional view taken through the implement.
Figure 3:
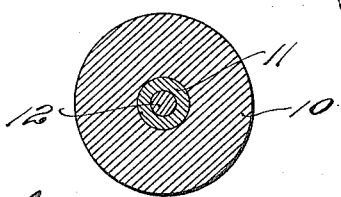
Fig. 3 is a cross sectional view taken substantially on the line 3—3 in Fig. 1.
Figure 4:
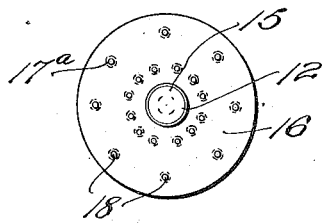
Fig. 4 is a view looking at the outer face of the needle plate.
Figure 5:
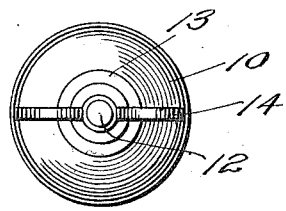
Fig. 5 is a plan view of the implement.
Figure 6:
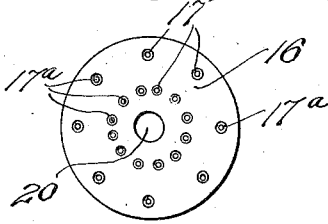
Fig. 6 is a view looking at the inner face of the needle plate.

The needle plate 16 is formed on its upper or inner face with a series of countersunk portions 17, and openings 17ª formed in the plate which are continuations of the countersunk portions, and a series of needles 18 are passed through the plate from the inner face thereof with their heads 19 seated in the countersunk portions 17. The plate is formed with a central opening 20, through which the bolt 12 passes, as will be readily seen by referring to Fig. 2, with the head 15 of the bolt abutting against the outer face of the needle plate. A disk or plate 21 is placed against the lower end of the handle 10, and is formed with a central opening 22 through which the bolt 12 passes, and interposed between the plates 16 and 21 is a resilient cushion plate 23, preferably formed of rubber, or some other similar suitable material, the bolt passing through a central opening 24 in the latter mentioned plate with the heads 19 of the needles 18 bearing against a face of the cushion plate.

From the foregoing description it will be readily seen that in assembling the parts described the needles are arranged in the needle plate to project downwardly as shown with the needle plate abutting against the cushion plate, and which in turn abuts against the disk 21, the bolt 12 being then arranged to pass through the mentioned plates after which the thumb nut 14 is threaded on the upper projecting end of the bolt so that when tightened the bolt will bind all of the plates together, and the entire arrangement will form a unitary structure as shown, and for the purpose set forth.

It will of course be understood that in the suggested use of the implement the same is grasped in the hand, and stabbed into the closed end of the bladder as the sausage meat is forced therein, so as to provide a means of escape for the air that is compressed as the sausage filling machine or other mechanism forces the sausage meat toward the closed end of the bladder.

But whenever this implement is used for piercing meat or like purposes, in case any needle or needles should strike a hard substance as they enter the meat or other particles, they will yield slightly because their stems may push upward through the openings 17ª and their heads indent the cushion 23, by which latter they will again be immediately projected as soon as the obstruction is removed or the implement is drawn away from the obstruction.

Having described my invention I claim:

In a device of the class described, the combination with a tubular handle, and a bolt through the same having an adjusting nut on its threaded upper end; of a metal plate over the lower end of the handle, a cushion plate beneath that just mentioned, a needle plate beneath the cushion plate, all of said plates being pierced with central openings through which the bolt passes and the needle plate with fine openings countersunk at their upper ends, a series of pins whose shanks pass through said fine openings and whose heads stand normally in the countersunk portion thereof against the cushion plate, for the purpose set forth.

In testimony whereof I affix my signature.

GABRIEL FROHMANN.

Copies of this patent may be obtained for five cents each, by addressing the "Commissioner of Patents, Washington, D. C."